US009163572B2

United States Patent
Jeschke

(10) Patent No.: US 9,163,572 B2
(45) Date of Patent: Oct. 20, 2015

(54) METHOD FOR DETERMINING A PRESSURE AT THE OUTPUT OF AN EXHAUST GAS SYSTEM

(75) Inventor: Jens Jeschke, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 1016 days.

(21) Appl. No.: 13/285,932

(22) Filed: Oct. 31, 2011

(65) Prior Publication Data

US 2012/0109494 A1 May 3, 2012

(30) Foreign Application Priority Data

Oct. 30, 2010 (DE) .................. 10 2010 050 161

(51) Int. Cl.
| | |
|---|---|
| F02D 9/02 | (2006.01) |
| F02D 28/00 | (2006.01) |
| F02D 41/00 | (2006.01) |
| F02D 41/14 | (2006.01) |
| F02D 41/24 | (2006.01) |
| F02M 25/07 | (2006.01) |

(52) U.S. Cl.
CPC .......... *F02D 41/0072* (2013.01); *F02D 41/145* (2013.01); *F02D 41/2474* (2013.01); *F02D 2041/1433* (2013.01); *F02D 2200/0402* (2013.01); *F02D 2200/703* (2013.01); *F02M 25/0707* (2013.01); *F02M 25/0709* (2013.01); *Y02T 10/47* (2013.01)

(58) Field of Classification Search
CPC .................. F02D 2200/703; F02D 2200/0402; F02D 41/0072; F02D 2041/1433; F02D 41/145; F02D 41/2474; Y02T 10/47; F02M 25/0707; F02M 25/0709
See application file for complete search history.

(56) References Cited

U.S. PATENT DOCUMENTS

| | | | | |
|---|---|---|---|---|
| 5,974,870 A | * | 11/1999 | Treinies et al. ............. | 73/114.33 |
| 7,474,954 B1 | | 1/2009 | Zagone | |
| 2003/0004677 A1 | * | 1/2003 | Olin ............................. | 702/140 |
| 2003/0101723 A1 | * | 6/2003 | Birkner et al. ................. | 60/602 |
| 2003/0192518 A1 | * | 10/2003 | Gopp et al. .............. | 123/568.21 |
| 2006/0011178 A1 | * | 1/2006 | Wild et al. ............... | 123/568.16 |
| 2007/0277778 A1 | * | 12/2007 | Eser et al. ..................... | 123/321 |
| 2008/0276914 A1 | * | 11/2008 | Bleile et al. .............. | 123/568.11 |
| 2008/0295514 A1 | | 12/2008 | Ono | |

FOREIGN PATENT DOCUMENTS

| | | |
|---|---|---|
| DE | 103 28 056 | 9/2004 |
| DE | 10 2004 043 365 | 3/2006 |
| DE | 10 2008 009 256 | 2/2009 |
| EP | 1 870 584 | 12/2007 |
| WO | WO 2009/037543 | 3/2009 |

OTHER PUBLICATIONS

German Search Report, issued in corresponding German Patent Appln. No. 10 2010 050 161.1.

\* cited by examiner

*Primary Examiner* — Hieu T Vo
*Assistant Examiner* — Arnold Castro
(74) *Attorney, Agent, or Firm* — Pearl Cohen Zedek Latzer Baratz LLP

(57) ABSTRACT

In a method for determining a pressure at the output of an exhaust gas system of an internal combustion engine system of a vehicle, a mass flow through the internal combustion engine system and an ambient pressure at a fresh air supply of the internal combustion engine system are detected. The pressure at the output of the exhaust gas system is determined as a function of the mass flow, the ambient pressure and throttling of the mass flow through the internal combustion engine system.

14 Claims, 1 Drawing Sheet

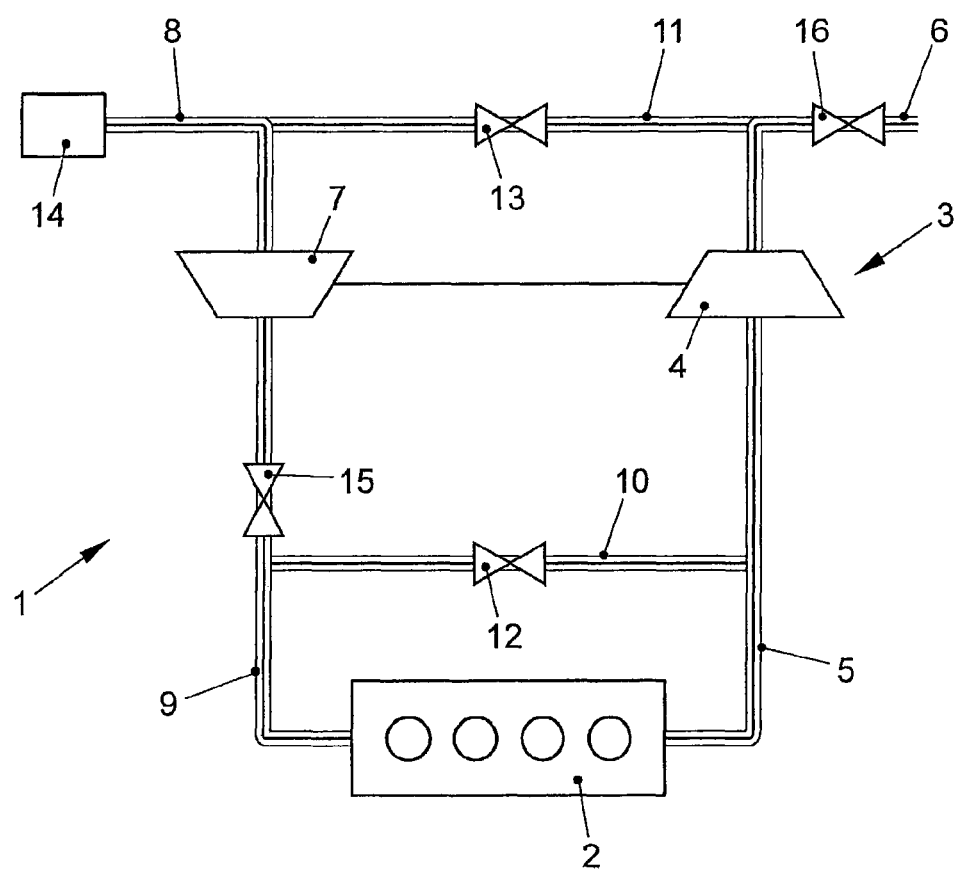

METHOD FOR DETERMINING A PRESSURE AT THE OUTPUT OF AN EXHAUST GAS SYSTEM

CROSS-REFERENCE TO RELATED APPLICATIONS

The present application claims priority to Application No. 10 2010 050 161.1, filed in the Federal Republic of Germany on Oct. 30, 2010, which is expressly incorporated herein in its entirety by reference thereto.

FIELD OF THE INVENTION

The present invention relates to a method for determining a pressure at the output of an exhaust gas system of an internal combustion engine system of a vehicle, especially an internal combustion engine system having an exhaust-gas turbocharger and a high-pressure exhaust-gas recirculation component as well as a low-pressure exhaust-gas recirculation component.

BACKGROUND INFORMATION

Internal combustion engine systems such as Diesel engines use exhaust-gas recirculation components to return a portion of the combustion gases of the internal combustion engine to a fresh-air supply of the internal combustion engine, in order to resupply this portion of the combustion waste gas together with fresh air to the internal combustion engine. In internal combustion engine systems, especially Diesel engines, that are equipped with an exhaust-gas turbocharger, it is distinguished between high-pressure exhaust-gas recirculation and low-pressure exhaust-gas recirculation. The high-pressure exhaust-gas recirculation component connects a reservoir downstream from an exhaust-gas turbine of the exhaust-gas turbocharger to an intake manifold of the internal combustion engine via a high-pressure exhaust-gas recirculation valve. The low-pressure exhaust-gas recirculation component connects an output of the exhaust gas system of the internal combustion engine, e.g., downstream from a particle filter, to a fresh-air supply upstream from a compressor of the exhaust-gas turbocharger. To achieve more precise control of the exhaust-gas recirculation, it is of great importance to obtain the most precise knowledge of the flow characteristics of the exhaust-gas recirculation component and the pressure conditions within the exhaust-gas recirculation component.

In this context, a method for operating an electronically controlled internal combustion engine is described in U.S. Pat. No. 7,474,954, in which a differential pressure sensor of a high-pressure exhaust-gas recirculation component is calibrated automatically. For this purpose an output of the differential pressure sensor is monitored when the engine is switched off, an actual deviation is determined and, if appropriate, a corresponding offset value is stored in a non-volatile manner.

U.S. Patent Application Publication No. 2008/0295514 relates to a control method for an internal combustion engine having a high-pressure exhaust-gas recirculation component and a low-pressure exhaust-gas recirculation component, in which an exhaust-gas recirculation quantity is adjusted such that a temperature of an exhaust-gas catalyst lies within a target range. To learn an opening amount of a high-pressure exhaust-gas recirculation valve and a low-pressure exhaust-gas recirculation valve, it is ascertained whether a fuel supply is switched off or whether the internal combustion engine is idling. A learning cycle is implemented as a function of this determination, in which the low-pressure exhaust-gas recirculation valve and the high-pressure exhaust-gas recirculation valve are closed completely and are then fully opened in predefined steps.

European Published Patent Application No. 1 870 584 relates to an exhaust-gas recirculation device of an internal combustion engine having an exhaust-gas turbocharger, a low-pressure exhaust-gas recirculation component and a high-pressure exhaust-gas recirculation component. According to one specific arrangement, an air supply quantity and the exhaust-gas recirculation rate are set to reference values and the relation between the low-pressure exhaust-gas recirculation gas quantity flowing through the low-pressure exhaust-gas recirculation component, and an opening degree of devices that are able to set the exhaust-gas recirculation gas quantity is learned and corrected, based on a differential pressure above a valve recorded by a differential pressure sensor.

Finally, PCT International Published Patent Application No. WO 2009/037543 describes an exhaust-gas recirculation device for an internal combustion engine, which has a high-pressure exhaust-gas recirculation component and a low-pressure exhaust-gas recirculation component. The high-pressure exhaust-gas recirculation component is controlled such that an oxygen concentration of the air aspirated into the cylinders corresponds to a target value that is set according to the operating state of the internal combustion engine. The low-pressure exhaust-gas recirculation component is controlled such that the low-pressure exhaust-gas recirculation gas is conducted into the intake at a target flow rate.

The low-pressure exhaust-gas recirculation component is undergoing continuous further development, one focus in the development being a reduction of flow losses through the low-pressure exhaust-gas recirculation circuit. However, in systems which are optimized with regard to flow losses there are problems with the overall system regarding the robustness of the metering of the low-pressure exhaust-gas recirculation gas. For example, if such a system is operated on an engine test stand or a chassis dynometer, such as for certification purposes, the exhaust-gas measuring technology creates interference. Due to the aspiration or thinning of the exhaust-gas, a different vacuum pressure than would be the case in a standstill of the vehicle is produced at the end of the exhaust gas system. This vacuum pressure may even cause fresh air from an intake region downstream from the compressor to reach the exhaust gas system directly through the low-pressure exhaust-gas recirculation component. All in all, a system that is optimized with regard to flow losses responds to pressure changes at the end of the exhaust gas system in a sensitive manner. Even a slight fault in the exhaust-gas pressure such as 10 hPa, for instance, interferes considerably with the low-pressure exhaust-gas recirculation component, since such a fault is of a similar order of magnitude as the required scavenging gradient of the low-pressure exhaust-gas recirculation component. Detecting the pressure at the output of the exhaust gas system with the aid of a pressure sensor is technically difficult, since the sensor preferably would have to have an accuracy of less than 1 hPa at a burst pressure of 1000 hPa, for instance, and furthermore, would have to be usable in the technically difficult environment of the exhaust gas system.

SUMMARY

Example embodiments of the present invention determine the pressure at the output of the exhaust gas system in order to be able to adapt the exhaust-gas pressure at the end of the exhaust gas system accordingly.

According to example embodiments of the present invention, a method is provided for determining a pressure at the output of an exhaust gas system of an internal combustion engine system of a vehicle. In the method, a mass flow through the internal combustion engine system and an ambient pressure of a fresh air supply of the internal combustion engine system are detected. The pressure at the output of the exhaust gas system is automatically determined as a function of the mass flow, the ambient pressure and throttling of the mass flow through the internal combustion engine system. No pressure sensor is consequently required at the output of the exhaust gas system. The mass flow through the internal combustion engine system is detectable with the aid of a hot-film air mass meter inside the fresh air supply, for instance. Such a hot-film air mass meter is usually installed in internal combustion engine systems anyway. As will be described in more detail in the following text, the throttling of the mass flow through the internal combustion system is able to be determined in relatively uncomplicated and precise manner in certain operating states of the internal combustion engine system, so that the pressure at the output of the exhaust gas system is able to be determined with high precision on the basis of this information.

The throttling of the mass flow through the internal combustion engine system may be determined with the aid of a flow model of the internal combustion engine system. For instance, an engine charge, which is determined from an intake-manifold pressure and an intake-manifold temperature; a high-pressure exhaust-gas recirculation mass flow, which is determined from a pressure upstream from a turbine of an exhaust-gas turbocharger of the internal combustion engine system, a pressure in the intake manifold and a valve position; a fresh air mass, which is determined with the aid of a hot-film air mass meter; and a low-pressure exhaust-gas recirculation mass flow may be entered in the flow model. It is then possible to determine the pressure at the output of the exhaust gas system from the flow model, the ambient pressure at the fresh air supply, and a valve position of a low-pressure exhaust-gas recirculation valve.

The method may be implemented during standstill of an internal combustion engine of the internal-combustion engine system. This simplifies the flow model, and the throttling of the mass flow through the internal combustion engine system is able to be determined much more easily and precisely.

The internal combustion engine system may have a low-pressure exhaust-gas recirculation component having a low-pressure exhaust-gas recirculation valve. The low-pressure exhaust-gas recirculation component couples the fresh air supply to the output of the exhaust gas system. The throttling of the mass flow through the internal combustion engine system is determined by determining throttling of a mass flow through the low-pressure exhaust-gas recirculation component. The mass flow through the low-pressure exhaust-gas recirculation component depends on a setting of the low-pressure exhaust-gas recirculation valve. This throttling of the mass flow through the low-pressure exhaust-gas recirculation component may be stored in a characteristics map or in a characteristic curve, for example, and determined accordingly by readout of the characteristics map or the characteristic curve.

Furthermore, the internal combustion engine system may include a throttle valve for influencing a mass flow from the fresh air supply to an intake manifold of the internal combustion engine. In this case the throttling of the mass flow through the internal combustion engine system may be determined in that throttling of a mass flow through the internal combustion engine and the throttle valve as a function of a setting of the throttle valve is determined.

In addition, the vehicle may be equipped with an exhaust-gas turbocharger and a high-pressure exhaust-gas recirculation component. The exhaust-gas turbocharger includes a turbine which is disposed between an exhaust-gas output of the internal combustion engine and the exhaust gas system; it also includes a compressor which is coupled to the turbine and disposed between the fresh air supply and the intake manifold. The high-pressure exhaust-gas recirculation component couples the exhaust-gas output of the internal combustion engine to the intake manifold via a high-pressure exhaust-gas recirculation valve. To determine the throttling of the mass flow through the internal combustion engine system, throttling of the mass flow through the compressor, the turbine and the high-pressure exhaust-gas recirculation component as a function of a setting of the high-pressure exhaust-gas recirculation valve is determined.

For a stationary engine the throttling of the mass flow through the internal combustion engine system depends only on the setting of the corresponding valves, e.g., the low-pressure exhaust-gas recirculation valve, the throttle valve, and the high-pressure exhaust-gas recirculation valve. As a result, the throttling of the mass flow through the different branches of the internal combustion engine system is able to be determined relatively easily and precisely. A further simplification of the determination of the throttling of the mass flow through the internal combustion engine system results if individual branches of the internal combustion engine system are closed or largely closed, so that the mass flow through these branches is approximately zero.

For example, the throttle valve and the high-pressure exhaust-gas recirculation valve may be closed for implementing the method. The low-pressure exhaust-gas recirculation valve, on the other hand, remains open, so that the mass flow through the internal combustion engine system flows substantially through the low-pressure exhaust-gas recirculation component. Corresponding throttling of the mass flow through the low-pressure exhaust-gas recirculation component may be determined fairly precisely as a function of a setting of the low-pressure exhaust-gas recirculation valve. Moreover, the method is able to be simplified in that the low-pressure exhaust-gas recirculation valve is opened completely, so that the throttling of the mass flow through the internal combustion engine system is determined solely by the throttling of the mass flow through the low-pressure exhaust-gas recirculation component when the low-pressure exhaust-gas recirculation valve is fully open. This throttling may be determined in advance, such as from construction data of the low-pressure exhaust-gas recirculation component, for example.

The throttle valve, the high-pressure exhaust-gas recirculation valve and the low-pressure exhaust-gas recirculation valve may be opened. These valves and the throttle valve are preferably completely open. In a standstill of the internal combustion engine, throttling of the mass flow through the internal combustion engine system adjusted in this manner may be determined in advance, from construction data or measured data, for instance, so that the throttling of the mass flow through the internal combustion engine system is available with high precision.

A plurality of pressures may be determined one after the other at the output of the exhaust gas system at different settings of the throttle valve, the high-pressure exhaust-gas recirculation valve and the low-pressure exhaust-gas recirculation valve. The pressure at the output of the exhaust gas system is determined from the plurality of pressures, for instance by averaging. When implementing the pressure at the output of the exhaust gas system at different settings of the valves and the throttle valve, errors, such as with regard to the throttling of the mass flow through the correspondingly configured internal combustion engine system, or with regard to the detection of the ambient pressure or the mass flow through the internal combustion engine system, are able to be averaged out and the pressure at the output of the exhaust gas system is therefore able to be determined with high accuracy.

The method may be implemented in an overrun operation of the internal combustion engine. In overrun operation of the internal combustion engine the flow model is simplified because no influences of a combustion process must be taken into account. It is therefore possible to determine the throttling of the mass flow through the internal combustion engine system in a simpler and more precise manner.

The internal combustion engine system may include a low-pressure exhaust-gas recirculation component having a low-pressure exhaust-gas recirculation valve. The low-pressure exhaust-gas recirculation component couples the fresh air supply to the output of the exhaust gas system. Furthermore, the internal combustion engine system includes a throttle valve for influencing a mass flow from the fresh air supply to an intake manifold of the internal combustion engine. To carry out the method in overrun operation, the throttle valve is closed, and the throttling of the mass flow through the internal combustion engine system is determined in that throttling of a mass flow through the low-pressure exhaust-gas recirculation component as a function of a setting of the low-pressure exhaust-gas recirculation valve is determined. When the throttle valve is closed, the mass flow through the internal combustion engine system substantially moves through the low-pressure exhaust-gas recirculation component, which simplifies the flow model, the throttling of the mass flow through the internal combustion engine system being determined solely by the throttling of the mass flow in the low-pressure exhaust-gas recirculation component. This is able to be measured in advance, e.g. with a fully open low-pressure exhaust-gas recirculation valve, or be derived from construction data.

The vehicle may have an exhaust-gas turbocharger and a high-pressure exhaust-gas recirculation component. The exhaust-gas turbocharger includes a turbine which is disposed between an exhaust-gas output of the internal combustion engine and the exhaust gas system, and a compressor which is coupled to the turbine and situated between the fresh air supply and the intake manifold. The high-pressure exhaust-gas recirculation component couples the exhaust-gas output to the intake manifold via a high-pressure exhaust-gas recirculation valve. To implement the method in overrun operation, the high-pressure exhaust-gas recirculation valve is opened. This allows an air or exhaust-gas charge present in the engine, for example, to circulate through the engine and the high-pressure exhaust-gas recirculation component when the throttle valve is closed in overrun operation of the vehicle, without any effect on the mass flow through the internal combustion engine system. Thus, the mass flow moves through the internal combustion engine system substantially only through the low-pressure exhaust-gas recirculation component, which, as described earlier, makes it possible to determine the throttling of the mass flow through the internal combustion engine system in relatively simple and precise manner, which in turn makes it possible to accurately determine the pressure at the output of the exhaust gas system.

The mass flow through the internal combustion engine system may be detected with the aid of a hot-film air mass meter, which is disposed in the fresh air supply of the internal combustion engine. According to this arrangement, the hot-film air mass meter is calibrated by closing the throttle valve, opening the high-pressure exhaust-gas recirculation valve, and closing the low-pressure exhaust-gas recirculation valve. Closing the throttle valve and the low-pressure exhaust-gas recirculation component causes the mass flow through the internal combustion engine system to be substantially inhibited completely, so that the hot-film air mass meter is able to be calibrated to its zero value in this state.

An internal combustion engine system for a vehicle is provided as well. The internal combustion engine system includes a first detection device for detecting a mass flow through the internal combustion engine system, a second detection device for detecting an ambient pressure at a fresh air supply of the internal combustion engine system, and a processing unit. The processing unit determines a pressure at an output of an exhaust gas system of the internal combustion engine system as a function of the mass flow, the ambient pressure, and throttling of the mass flow through the internal combustion engine system. The internal combustion engine system preferably is suitable for implementing the previously described method or one of its variants, and therefore also provides the advantages described in connection with the method and its variants.

Example embodiments of the present invention are described in more detail below with reference to the appended FIGURE.

BRIEF DESCRIPTION OF THE DRAWINGS

The FIGURE schematically illustrates an internal combustion engine system according to an example embodiment of the present invention.

DETAILED DESCRIPTION

The FIGURE schematically shows an internal combustion engine system 1 which includes an internal combustion engine 2 and an exhaust-gas turbocharger 3. Exhaust-gas turbocharger 3 has a turbine 4, which is disposed between an exhaust-gas output 5 of internal combustion engine 2 and an exhaust gas system 6 of internal combustion engine system 1. In addition, exhaust-gas turbocharger 3 includes a compressor 7, which is mechanically linked to turbine 4 and disposed between a fresh air supply 8 and an intake manifold 9 of internal combustion engine 2. Internal combustion engine system 1 furthermore includes a high-pressure exhaust-gas recirculation component 10 and a low-pressure exhaust-gas recirculation component 11. High-pressure exhaust-gas recirculation component 10 couples exhaust-gas output 5 to intake manifold 9 and includes a high-pressure exhaust-gas recirculation valve 12, which is able to influence a mass flow through high-pressure exhaust-gas recirculation component 10. Low-pressure exhaust-gas recirculation component 11 connects exhaust gas system 6 to fresh air supply 8 and includes a low-pressure exhaust-gas recirculation valve 13, which is able to influence a mass flow through low-pressure exhaust-gas recirculation component 11. Situated at the input of fresh air supply 8 is a device 14 which is able to determine a mass flow through fresh air supply 8 and to measure a pressure at the input of fresh air supply 8. To determine the fresh air mass flow, device 14 may include a hot-air mass flow meter, for example, and an air pressure sensor for determining the air pressure. Finally, a throttle valve 15, which is able to influence a mass flow downstream from compressor 7 into intake manifold 9, is disposed between compressor 7 and intake manifold 9. Internal combustion engine system 1 may include additional sensors, which are not shown in the FIGURE for reasons of clarity. These additional sensors, for example, include a pressure sensor in intake manifold 9 to determine an intake-manifold pressure, a temperature sensor in intake manifold 9 to determine an intake-manifold temperature, and a pressure sensor in exhaust-gas output 5 to detect a pressure downstream from turbine 4.

With the aid of the mass flow balance at the input side of internal combustion engine 2, it is basically possible to determine the mass flow through low-pressure exhaust-gas recirculation component 11, in the following manner:

Low-pressure exhaust-gas recirculation mass flow=engine charge−high-pressure exhaust-gas recirculation mass flow−fresh air mass flow.

The engine charge may be determined from the intake manifold pressure and the intake-manifold temperature, for example, the high-pressure exhaust-gas recirculation mass flow from the pressure downstream from turbine 3, the pressure in intake manifold 9, and a valve position of high-pressure exhaust-gas recirculation valve 12, and the fresh air mass flow may be determined with the aid of hot-film air mass meter 14. However, it becomes clear very quickly that considerable measuring and modeling errors are entered into this mass flow balance; the engine charge, for example, includes intake-manifold pressure errors and mix-temperature errors; the fresh-air mass flow includes errors of hot-film air mass meter 14 and pulsation errors; the valve position of the high-pressure exhaust-gas recirculation valve includes errors of the effective area of the valve due to soiling and component tolerances, and the pressure downstream from turbine 4 includes errors of hot-film air mass meter 14 and turbine modeling errors.

Performing a model-based regulation of internal combustion engine system 1, especially a model-based regulation of a mass flow through low-pressure exhaust-gas recirculation component 11, requires information about a pressure downstream and upstream from low-pressure exhaust-gas recirculation valve 13 as well as the valve position of low-pressure exhaust-gas recirculation valve 13. If no vacuum pressure exists at the output of exhaust gas system 5, then the pressure at the end of exhaust gas system 6 differs from the ambient pressure solely by flow losses of the exhaust gas system. However, if vacuum pressure is produced at the end of exhaust gas system 6, for instance due to aspiration, then the pressure differential at the end of the exhaust gas system relative to the ambient pressure, which is detected by a sensor of device 14, for example, must be taken into account and adapted in a corresponding control. In general, a comparison of a modeled low-pressure exhaust-gas recirculation mass flow and the mass flow balance may be used for this purpose. The modeled low-pressure exhaust-gas recirculation mass flow depends on the pressure upstream from the low-pressure exhaust-gas recirculation valve, i.e., the unknown pressure in exhaust gas system 6, the pressure downstream from the low-pressure exhaust-gas recirculation valve, i.e., the pressure in fresh air supply 8, that is to say, the ambient air pressure, and the valve position of the low-pressure exhaust-gas recirculation valve. The above equation for the mass flow balance may therefore be used to consider the vacuum pressure at the end of exhaust gas system 6 at any time while engine 2 is in operation, and thus to adapt the regulation of engine 2. In this case, however, all above-mentioned errors entered in the mass flow balance are superposed simultaneously, and the adaptation result will thus exhibit considerable adaptation blurriness.

According to example embodiments of the present invention, special engine states are therefore used for determining the pressure at the output of exhaust gas system 6 and thus for adapting the regulation of internal combustion engine system 1. For example, a multitude of the aforementioned error sources may be eliminated if the pressure is determined when the engine is standing still, e.g., prior to starting the engine, or in the case of a start-stop system, in stop operation. When the engine is at a standstill, for example, the engine charge is constant or even zero, depending on the position of the crankshaft. The engine charge is furthermore no longer dependent on the mix temperature, since no hot gases are returnable via the high-pressure exhaust-gas recirculation component. In addition, no pulsation errors arise at the hot-film air mass meter since the pistons of the internal combustion are not moving. In an engine standstill, moreover, valves such as exhaust-gas recirculation valves 12, 13, and flaps such as the throttle valve 15 or an exhaust flap 16 are actuable as desired because no combustion is taking place. For example, closing throttle valve 15 and high-pressure exhaust-gas recirculation valve 12 has the result that only values of the hot-film air mass meter and the low-pressure exhaust-gas recirculation valve are entered in the mass flow balance.

Another especially suitable engine state for determining the pressure at the output of exhaust gas system 6 and for adapting the regulation of internal combustion engine system 1 is an overrun operation of the engine because in this operating state it is also the case that no hot exhaust gases are returned to intake manifold 9 via the high-pressure exhaust-gas recirculation component, and valves 12, 13 and flaps 15, 16 are able to be actuated as desired.

In the following text, different engine states are described by way of example with reference to the FIGURE, the engine states relating to states in which the pressure at the output of exhaust gas system 6 is able to be determined with high precision, so that the regulation of internal combustion engine system 1 is able to be adapted to the pressure at the output of exhaust gas system 6.

In a first example, internal combustion engine 2 is standing still. Low-pressure exhaust-gas recirculation valve 13 is completely open, exhaust flap 16 is open, throttle valve 15 is closed, and high-pressure exhaust-gas recirculation valve 12 is closed. Vacuum pressure as it may be produced on a roller dynamometer by aspiration, for instance, prevails at the end of exhaust gas system 6. The mass flow, which is measured by hot-film air mass meter 14, goes directly through low-pressure exhaust-gas recirculation component, 11 into exhaust gas system 6. Closing of low-pressure exhaust-gas recirculation valve 13 makes it possible to reduce the mass flow of the hot-film air mass meter. When low-pressure exhaust-gas recirculation valve 13 is completely closed, the mass flow moves toward zero, at least theoretically. If this is not the case, the hot-film air mass meter either is calibrated incorrectly, or a partial mass flow is flowing through blow-by lines or through exhaust-gas turbocharger 3, for instance. This basic influence of the system is determinable by closing all actuators of the system. Hot-film air mass meter 14 may therefore be calibrated when low-pressure exhaust-gas recirculation valve 13 is closed, and an offset correction, in particular, may be carried out. When low-pressure exhaust-gas recirculation valve 13 is open, it is then possible, based on the ambient pressure at fresh air supply 8 and throttling of the mass flow through fresh air supply 8, low-pressure exhaust-gas recirculation component 11 including low-pressure exhaust-gas recirculation valve 13 and exhaust gas system 6, and the mass flow, which is determined by hot-film air mass meter. When overpressure is present at the end of exhaust gas system 6, the mass flow through hot-film air mass meter 14 would rise when the low-pressure exhaust-gas recirculation valve is closed, i.e., a negative mass flow would be modified in the direction of zero by closing low-pressure exhaust-gas recirculation valve 13.

In a second exemplary implementation of the method, internal combustion engine 2 is at a standstill, low-pressure exhaust-gas recirculation valve 13 is completely open, exhaust flap 16 is open, throttle valve 15 is closed, and high-pressure exhaust-gas recirculation valve 12 is closed. It is assumed that vacuum pressure prevails at the end of exhaust gas system 6. The mass flow measured by hot-film air mass meter 14 once again flows into exhaust gas system 6 directly through low-pressure exhaust-gas recirculation component 11. Closing of exhaust flap 16 allows a modification of this mass flow. Exhaust flap 16 may be closed to such a degree, for instance, that no mass flow, or no more than a minimum mass flow, is flowing via low-pressure exhaust-gas recirculation component 11. In this state it is possible to implement an offset error calibration of hot-film air mass meter 14 again. When the exhaust flap is open, the vacuum pressure at the end of exhaust gas system 6 is able to be determined from the mass flow measured by hot-film air mass meter 14, the ambient pressure in fresh air supply 8, and throttling of the mass flow through fresh air supply 8, low-pressure exhaust-gas recirculation component 11 and exhaust gas system 6. The throttling of the mass flow through fresh air supply 8, low-pressure exhaust-gas recirculation component 11 and exhaust gas system 6 may be specified based on construction data of internal combustion engine system 1 or, in case of a previously conducted measurement, it may be predefined as a fixed value or a characteristics map and stored in a corresponding control unit of internal combustion engine system 1.

In another exemplary determination of the pressure at the output of exhaust gas system 6, internal combustion engine 2 is at a standstill, low-pressure exhaust-gas recirculation valve 13 is completely open, exhaust flap 16 is open, throttle valve 15 is open, and high-pressure exhaust-gas recirculation valve 12 is open. It is assumed that vacuum pressure prevails at the end of the exhaust gas system. The mass flow measured by hot-film air mass meter 14 is routed to exhaust gas system 6 partially through low-pressure exhaust-gas recirculation component 11 and partially through compressor 7, throttle valve 15, high-pressure exhaust-gas recirculation component 10 and turbine 4. By closing exhaust flap 16, the mass flow of hot-film air mass meter 14 is able to be modified. When the exhaust flap is closed, there is no further mass flow via low-pressure exhaust-gas recirculation valve 11 and high-pressure exhaust-gas recirculation valve 12, so that hot-film air mass meter 14 may be calibrated in this state. When exhaust flap 16 is open, the vacuum pressure at the output of exhaust gas system 6 is able to be determined from the mass flow measured by hot-film air mass meter 14 and from throttling of the mass flow through internal combustion engine system 1. The throttling of the mass flow through internal combustion engine system 1 is determined by the throttling through fresh air supply 8, exhaust-gas recirculation components 10 and 11, throttle valve 15, compressor 7, turbine 4, and exhaust gas system 6. This throttling may be provided by construction data, for instance, or with the aid of a measurement performed in advance. In this example, a considerably greater mass flow is able to be conducted through internal combustion engine system 1 than in the two previous examples. This makes it possible to reduce measuring inaccuracies of hot-film air mass meter 14. If overpressure prevails at the end of the exhaust gas system, then the flow direction of the mass flow through exhaust-gas recirculation valves 13, 12 substantially reverses direction, i.e., the mass flows are traveling from the exhaust-gas side to the fresh-air side, as is also the case in actual engine operation. This changes the effective direction of the opening of exhaust-gas recirculation valves 12, 13 or exhaust flap 16, that is to say, opening of an exhaust-gas recirculation valve 12, 13 or exhaust flap 16 now reduces the mass flow at hot-film air mass meter 14.

In all previously mentioned examples, all valves and flaps are calculated in model-based manner during standstill of the engine, via a generally known description of a throttling or flow-through function. Input quantities for the model calculation are the value of hot-film air mass meter 14 and the ambient pressure. Hot-film air mass meter 14 should be able to recognize backflows and to measure them in order to be able to distinguish between an overpressure and a vacuum pressure at the end of exhaust gas system 6. The missing pressure on the other side of the valve is able to be calculated with the aid of the model-based description, provided the mass flow and pressure on one side of the valve and the valve position are known.

To determine the pressure state at the end of exhaust gas system 6, the throttling of the mass flow through internal combustion engine system 1 may be described empirically. It is possible, for instance, to define a characteristic curve, which contains the pressure differential between ambient pressure and the end of exhaust gas system 6, as a function of the (offset-corrected) hot-film air mass meter mass flow for a specific valve constellation, e.g., low-pressure exhaust-gas recirculation valve 13 and exhaust flap are open, and high-pressure exhaust-gas recirculation valve 12 and throttle valve 15 are closed. If only specific position combinations of the valves and flaps are aimed for, then the variable quantities in the throttling are reduced to such an extent that the behavior of the low-pressure exhaust-gas recirculation path and the exhaust gas system is able to be described by only a single characteristic curve.

In summary, the exhaust-gas pressure at the end of the exhaust gas system is determined by a model-based adaptation. Valves and flaps in the internal combustion engine system are described by throttle models. In this context, it is assumed that the mass flow through the low-pressure exhaust-gas recirculation component or the exhaust flap is known, e.g., an offset-corrected hot-film air mass meter mass flow while the engine is at a standstill, and the pressure at the end of the exhaust gas system is modeled via the model of the low-pressure exhaust-gas recirculation valve and/or the exhaust flap, starting from the ambient pressure. The difference from the result of the modeling and the measured ambient pressure is the adaptation value for the state at the end of exhaust gas system 6. This adaptation is performed while the engine is at a standstill. Furthermore, it is possible to bring the valves and flaps of internal combustion engine system 1 into predefined positions, which allows the adaptation to be performed also while the engine is running, e.g., in an overrun operation of the engine; in this case, however, the result may be less precise with regard to an error allocation, and the position specification may influence the emissions and the driving behavior of the internal combustion engine system. When the engine is at a standstill, the offset-error calibration of the hot-film air mass meter mass flow may lead to a much simplified empirical model, e.g., a characteristic curve.

What is claimed is:

1. A method for determining a pressure at an output of an exhaust gas system of an internal combustion engine system of a vehicle, the internal combustion engine system comprising:
   an internal combustion engine;
   a fresh air supply;
   an exhaust system; and
   a low-pressure exhaust-gas recirculation component including a low-pressure exhaust-gas recirculation valve, which couples the fresh air supply to the output of the exhaust gas system,
   the method comprising:
   detecting a mass flow through the internal combustion engine system;
   detecting an ambient pressure at a fresh air supply of the internal combustion engine system;
   determining a throttling of the mass flow through the internal combustion engine system by determining throttling of mass flow through the low-pressure exhaust-gas recirculation component as a function of a setting of the low-pressure exhaust-gas recirculation valve; and
   determining the pressure at the output of the exhaust gas system as a function of the mass flow, the ambient pressure, and the throttling of the mass flow through the internal combustion engine system.

2. The method according to claim 1, further comprising determining the throttling of the mass flow through the internal combustion engine system in accordance with a flow model of the internal combustion engine system.

3. The method according to claim 1, wherein the method is performed at a standstill of an internal combustion engine of the internal combustion engine system.

4. The method according to claim 1, further comprising determining the throttling of the mass flow through the low-pressure exhaust-gas recirculation component in accordance with one of (a) a characteristic curve and (b) a characteristics map.

5. The method according to claim 1, wherein the internal combustion engine system includes a throttle valve adapted to influence a mass flow from the fresh air supply to an intake manifold of the internal combustion engine, the determination of the throttling of the mass flow through the internal combustion engine system including determining a throttling of a mass flow through the internal combustion engine and the throttle valve as a function of a setting of the throttle valve.

6. The method according to claim 5, wherein the vehicle includes an exhaust-gas turbocharger and a high-pressure exhaust-gas recirculation component, the exhaust-gas turbocharger including a turbine disposed between an exhaust-gas output of the internal combustion engine and the exhaust gas system, and a compressor coupled to the turbine and disposed between the fresh air supply and the intake manifold, the high-pressure exhaust-gas recirculation component coupling the exhaust-gas output to the intake manifold via a high-pressure exhaust-gas recirculation valve, the determination of the throttling of the mass flow through the internal combustion engine system including determining a throttling of a mass flow through the compressor, the turbine and the high-pressure exhaust-gas recirculation component as a function of a setting of the high-pressure exhaust-gas recirculation valve.

7. The method according to claim 6, wherein, to implement the method, the throttle valve is closed, the high-pressure exhaust-gas recirculation valve is closed, and the low-pressure exhaust-gas recirculation valve is opened.

8. The method according to claim 6, wherein, to implement the method, the throttle valve is open, the high-pressure exhaust-gas recirculation valve is opened, and the low-pressure exhaust-gas recirculation valve is opened.

9. The method according to claim 6, further comprising determining a plurality of pressures one after the other at the output of the exhaust gas system at different settings of the throttle valve, the high-pressure exhaust-gas recirculation valve and the low-pressure exhaust-gas recirculation valve, the pressure at the output of the exhaust gas system being determined from the plurality of pressures, by averaging.

10. The method according to claim 1, wherein the method is performed in overrun operation of an internal combustion engine of the internal combustion engine system.

11. The method according to claim 10, wherein the internal combustion engine system includes a throttle valve adapted to influence a mass flow from the fresh air supply to an intake manifold of the internal combustion engine, the throttle valve being closed to implement the method and the throttling of the mass flow through the internal combustion engine system being determined by determining throttling of a mass flow through the low-pressure exhaust-gas recirculation component as a function of a setting of the low-pressure exhaust-gas recirculation valve.

12. The method according to claim 11, wherein the vehicle includes an exhaust-gas turbocharger and a high-pressure exhaust-gas recirculation component, the exhaust-gas turbocharger including a turbine disposed between an exhaust-gas output of the internal combustion engine and the exhaust gas system, and a compressor coupled to the turbine and disposed between the fresh air supply and the intake manifold, the high-pressure exhaust-gas recirculation component coupling the exhaust-gas output to the intake manifold via a high-pressure exhaust-gas recirculation valve, the high-pressure exhaust-gas recirculation valve being opened to implement the method.

13. The method according to claim 6, wherein the mass flow through the internal combustion engine system is detected by a hot-film air mass meter in the fresh air supply, the method further comprising calibrating the hot-film air mass meter, the throttle valve being closed to implement the method, the high-pressure exhaust-gas recirculation valve being opened, and the low-pressure exhaust-gas recirculation valve being closed.

14. An internal combustion engine system for a vehicle, comprising:
   a mass flow detection device adapted to detect a mass flow through the internal combustion engine system;
   an ambient pressure detection device adapted to detect an ambient pressure at a fresh air supply of the internal combustion engine system;
   a low-pressure exhaust-gas recirculation component including a low-pressure exhaust-gas recirculation valve, which couples the fresh air supply to an exhaust gas system; and
   a processing unit adapted to determine a pressure at the output of an exhaust gas system of the internal combustion engine system as a function of the mass flow, the ambient pressure, throttling of the mass flow through the internal combustion engine system, wherein the throttling of the mass flow through the internal combustion engine system is determined by determining a throttling of a mass flow through the low-pressure exhaust-gas recirculation component as a function of a setting of the low-pressure exhaust-gas recirculation valve.

* * * * *